July 30, 1935.  B. J. ANDERSON  2,009,571
VELOCIPEDE FRAME
Filed Nov. 28, 1934
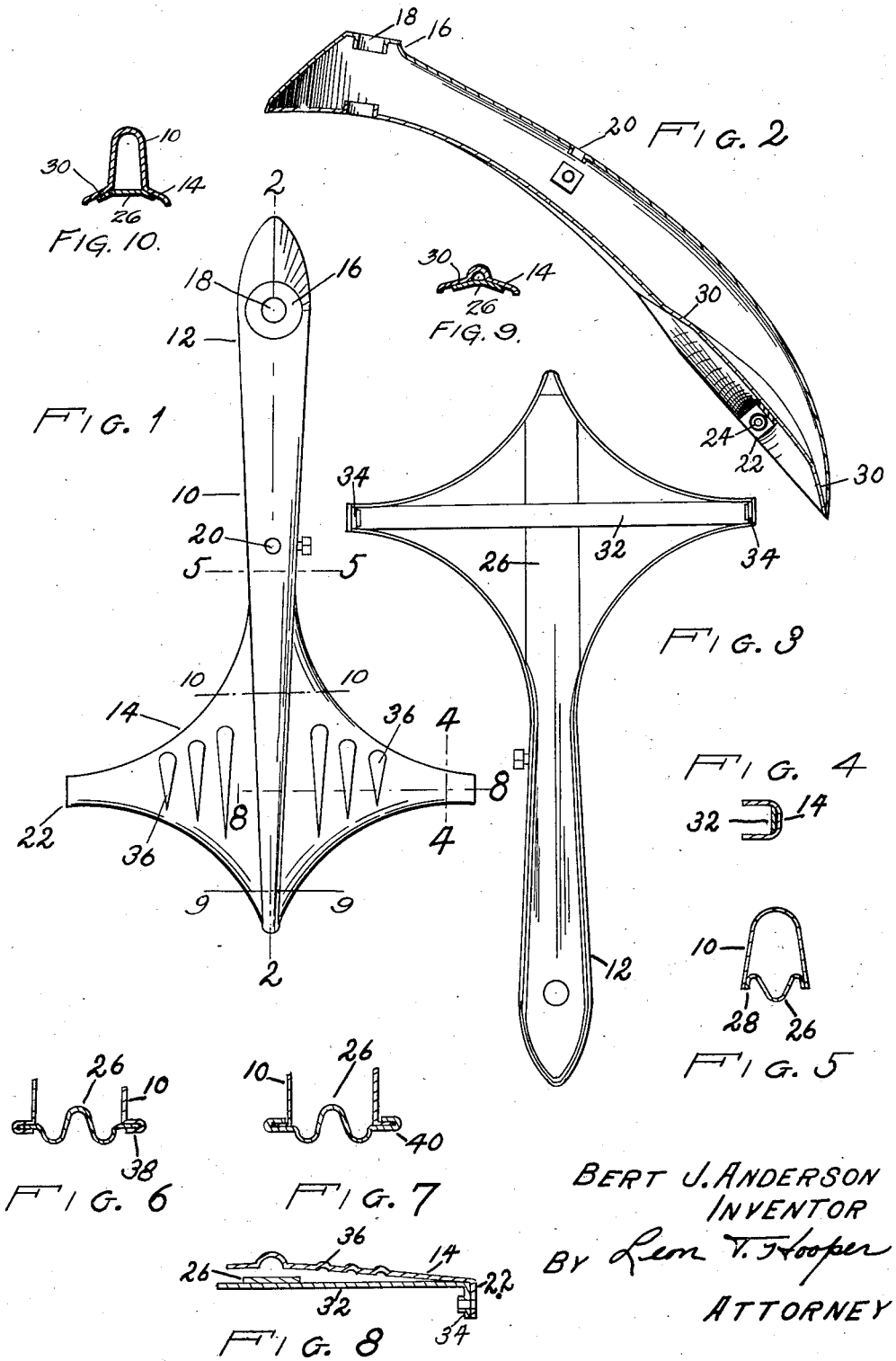
BERT J. ANDERSON
INVENTOR
BY Leon T. Hooper
ATTORNEY Patented July 30, 1935

2,009,571

UNITED STATES PATENT OFFICE 2,009,571

VELOCIPEDE FRAME

Bert J. Anderson, Hammond, Ind.

Application November 28, 1934, Serial No. 755,147

14 Claims. (Cl. 208—113)

This invention relates to an improvement in a velocipede frame and has for one of its principal objects the construction of an entire frame, including a back-bone member and a transverse axle supporting member, from a single piece of sheet metal.

Another and still further important object of this invention relates to the method of joining the lower edges of the backbone portion of the frame to the corrugated spacing member.

Still another and further important object of the velocipede frame of this invention resides in the construction of the corrugated spacing member itself.

A still further important object of this invention resides in the cross member which is secured to the upper inside surface of the axle supporting portion of the frame and prevents spreading or distortion of the frame from excessive loads.

The invention shows other objects and features of advantage, some of which, with the foregoing, will be set forth in the following description.

The invention, in a preferred form, is illustrated in the annexed drawing and hereinafter more fully described.

In the drawing:

Figure 1 is a top plan view of the velocipede frame of this invention.

Figure 2 is a sectional view taken on the line 2—2 of Figure 1.

Figure 3 is a bottom plan view of the frame, and shows the relative positions of the cross member and the corrugated spacing member.

Figure 4 is a sectional view taken on the line 4—4 of Figure 1.

Figure 5 is a sectional view of the velocipede frame of this invention, taken on the line 5—5 of Figure 1.

Figure 6 is a sectional view of the frame, slightly enlarged, and shows a slight modification in the manner of attaching a corrugated spacing member.

Figure 7 is a sectional view of the frame and shows a still further modification in the matter of attaching a corrugated spacing member.

Figure 8 is a sectional view taken on the line 8—8 of Figure 1 and shows the relative positions of the cross member and the axle supporting portion of the frame.

Figure 9 is a vertical sectional view taken on the line 9—9 of Figure 1.

Figure 10 is a vertical sectional view taken on the line 10—10 of Figure 1.

As shown in the drawing:

The reference numeral 10 indicates in a general way the velocipede frame of this invention, which may be roughly divided into a restricted front portion 12 and an expanded rear axle supporting portion 14.

In the preferred embodiment of this invention, as shown in Figure 1 of the drawing, the head 16, having a steering post receiving aperture 18, may be formed in the single stamping. However, it is obvious that the head may be dispensed with and any of the conventional heads may be used instead.

The backbone portion of the frame is perforated, as is best shown by the reference numeral 20, to receive a saddle supporting member.

The axle supporting portion 14 of the frame terminates in downwardly turned opposing ends 22. Aligned perforations 24 in the ends 22 provide a support for an axle. A corrugated spacing member 26 extends from the front to the rear of the frame. A portion of the corrugated member 26 has downwardly turned edges 28, which are secured to the edges of the backbone portion of the frame. The rear portion of the member 26 is flat and is secured to the upper inside surface of the axle supporting portion of the frame, as is best shown by the reference numerals 30—30 in Figures 2, 9 and 10.

The cross member 32, which consists of a flat narrow strip of metal having downwardly turned perforated ends 34, is also secured to the inside upper surface of the rear portion of the frame. This cross member 32 is also secured to the member 26, as is best shown in Figure 3.

In the preferred embodiment of this invention, as shown in Figure 1, reenforcing ribs 36 are stamped in the axle supporting portion of the frame.

The corrugated spacing member 26 has been found to be very efficient in overcoming torsional strains and stress to which the frame may be subjected. This member may be secured to the frame by bending the edges of the frame around the edges of the corrugated member, as is best shown by the reference numeral 38 in Figure 6.

A further modication in the manner of securing the corrugated member 26 to the edges of the frame is shown in Figure 7, wherein the edges 40 of the corrugated member are bent around the edges of the frame.

It will be apparent from the foregoing that herein is provided a velocipede frame which may be economically produced and, because the entire structure is made up of one stamping which is reenforced both longitudinally and transversely, is rigid and sturdy.

Moreover, because the frame consists of a single stamping, breakage adjacent welds, or welds coming apart is eliminated.

I am aware that many changes may be made, and numerous details of construction varied throughout a wide range without departing from the principles of this invention, and I, therefore, do not purpose limiting the patent granted hereon otherwise than as necessitated by the prior art.

I claim as my invention:

1. A sheet metal velocipede frame formed from a single stamping and comprising a restricted backbone section and an expanded axle supporting section, a flat cross member secured to the inside surface of the axle supporting portion of the frame, and a corrugated member, part of which is secured to the edges of the backbone section of the frame and part of which is secured to the upper inside surface of the axle supporting portion of the frame.

2. In a sheet metal velocipede frame including a head, a backbone and a rear axle supporting portion, a spacing member extending the entire length of the frame and being secured to the lower edges of the head and backbone portions and to the inside upper surface of the rear axle supporting portion of the frame.

3. In a sheet metal velocipede frame including a head, a backbone and a rear axle supporting portion, the axle supporting portion having downwardly turned perforated axle receiving formations at opposed ends thereof transverse the longitudinal axis of the frame, a cross member having downwardly turned perforated ends positioned within the axle supporting portion of the frame, and a spacing member extending the entire length of the frame and being secured to the inside upper surface of the rear axle supporting portion of the frame.

4. In a sheet metal velocipede frame including a head, a backbone and a rear axle supporting portion, the axle supporting portion having downwardly turned perforated axle receiving formations at opposed ends thereof transverse the longitudinal axis of the frame, a cross member having downwardly turned perforated ends positioned within the axle supporting portion of the frame and secured to the inner surface of the downwardly turned ends and the upper inside surface of the axle supporting portion, and a spacing member extending the entire length of the frame and being secured to the inside upper surface of the rear axle supporting portion of the frame and also to said cross member.

5. In a velocipede frame formed of a single sheet metal member, and having a convex upper surface and a concave lower surface, an expanded axle supporting portion, an upwardly and forwardly extending backbone portion, and a cross member having downwardly turned apertured ends extending from one end of the axle supporting portion to the opposite end.

6. In a sheet metal velocipede frame formed of a single stamping having a restricted portion and an expanded axle supporting portion, the restricted portion being of substantially inverted U cross section, a corrugated member secured to the restricted portion adjacent the edges thereof, and a cross member beneath the axle supporting portion extending from one end of said portion to the opposite end.

7. A velocipede frame formed of a single sheet metal stamping and comprising a rear axle supporting portion and a backbone portion, the sides of said backbone portion being turned downwardly and spaced apart, and a corrugated spacing member having downwardly turned edges secured to the inside surface of said backbone portion and thence extending along and secured to the inside upper surface of the axle supporting portion of the frame.

8. In a sheet metal velocipede frame, a spacing member having a corrugated portion and a flat portion, said corrugated portion having edges adapted to be turned over and secured to the corresponding edges of the frame, and said flat portion adapted to be secured to the upper inside surface of the rear portion of the frame.

9. In a sheet metal velocipede frame formed of a single stamping and having a backbone portion and an axle supporting portion, said backbone portion being substantially U shaped in cross section, the lower edges of said backbone portion being turned outwardly, and a corrugated spacing member secured to the bottom surface of the outwardly turned edges of the frame and extending rearwardly to the end of said frame.

10. In a sheet metal velocipede frame formed of a single stamping and having a backbone portion and an axle supporting portion, said backbone portion being substantially U shaped in cross section, the lower edges of said backbone portion being turned outwardly, and a corrugated spacing member crimped over and secured to the outwardly turned edges of the frame, the rear end of said spacing member extending rearwardly and being secured to the upper inside surface of the frame adjacent the end thereof.

11. In a sheet metal velocipede frame formed of a single stamping and having a backbone portion and a rear axle supporting portion, the sides of said backbone portion being turned downwardly and spaced apart, a portion of each side adjacent the edges being turned outwardly thence downwardly thence inwardly to form a spacing member receiving groove, and a spacing member positioned within said groove and extending rearwardly and being secured to the inside upper surface of the frame.

12. In a sheet metal velocipede frame formed of a single stamping and having a backbone portion and a rear axle supporting portion, the sides of said backbone portion being turned downwardly and spaced apart, a portion of each side adjacent the edges being turned outwardly thence downwardly thence inwardly to form a spacing member receiving groove, and a spacing member positioned within said groove and extending therebeyond to the rear end of the frame.

13. In a sheet metal velocipede frame formed from a single stamping and including a perforated head portion, a backbone portion, and a rear axle supporting portion, the rear axle supporting portion having downwardly turned perforated axle receiving formations on opposed sides thereof, a cross member having downwardly turned perforated ends positioned within the axle supporting portion of the frame, said apertures being in alignment, and a spacing member having a perforation in alignment with the head perforation secured to the edges of a portion of the frame, said spacing member extending the entire length of the frame and being secured to the inside upper surface of the rear axle supporting portion of the frame and also to the cross member.

14. In a sheet metal velocipede frame formed of a single stamping and having a restricted portion and an expanded axle supporting portion, and a flat strap having downwardly turned perforated ends positioned transverse of the longitudinal axis of the frame and secured to the upper inside surface of the axle supporting portion of the frame.

BERT J. ANDERSON.